US011115141B2

(12) United States Patent
Pandey

(10) Patent No.: US 11,115,141 B2
(45) Date of Patent: Sep. 7, 2021

(54) WIRED COMMUNICATIONS DEVICE AND METHOD FOR OPERATING A WIRED COMMUNICATIONS DEVICE

(71) Applicant: NXP B.V., Eindhoven (NL)

(72) Inventor: Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 126 days.

(21) Appl. No.: 15/966,967

(22) Filed: Apr. 30, 2018

(65) Prior Publication Data
US 2019/0334642 A1    Oct. 31, 2019

(51) Int. Cl.
*H04L 7/00*   (2006.01)
*H04J 3/06*   (2006.01)
*H04L 25/49*  (2006.01)

(52) U.S. Cl.
CPC .......... *H04J 3/0647* (2013.01); *H04L 7/0066* (2013.01); *H04L 25/4904* (2013.01)

(58) Field of Classification Search
None
See application file for complete search history.

(56) References Cited

U.S. PATENT DOCUMENTS

| | | |
|---|---|---|
| 2002/0172179 A1 | 11/2002 | Grimsrud |
| 2003/0161348 A1* | 8/2003 | Mills ...................... H04L 12/12 370/509 |
| 2004/0019876 A1* | 1/2004 | Dravida .............. H04L 12/2801 717/117 |
| 2005/0195770 A1 | 9/2005 | Baliga et al. |
| 2006/0103458 A1 | 5/2006 | Hansen et al. |
| 2006/0188128 A1* | 8/2006 | Rhoads ................ G06K 7/1417 382/100 |
| 2010/0287402 A1 | 11/2010 | Kim et al. |
| 2013/0136063 A1* | 5/2013 | Zhang ................. H04L 27/2656 370/328 |
| 2013/0201316 A1* | 8/2013 | Binder .................... H04L 67/12 348/77 |
| 2019/0007092 A1 | 1/2019 | Bayesteh et al. |
| 2019/0268453 A1* | 8/2019 | Yu ..................... H04L 25/03866 |
| 2019/0273648 A1 | 9/2019 | Seo et al. |
| 2019/0334970 A1 | 10/2019 | Pandey |

OTHER PUBLICATIONS

Non-Final Rejection for U.S. Appl. No. 15/967,030, 15 pgs. (dated Oct. 4, 2019).
"Kapitel 5: Digitale Ubertragung im Basisband", Zurcher Hochschule Winterthur, Mitglied der Zurcher Fachhochschule, 13 pgs. Retreived from the internet at: URL:https://home.zhaw.ch/-rur/ntm/unterlagen/ntmkap53leicode.pdf (2005).

(Continued)

*Primary Examiner* — Ruihua Zhang
(74) *Attorney, Agent, or Firm* — Rajeev Madnawat

(57) ABSTRACT

Embodiments of a method and a device are disclosed. In an embodiment, a method for operating a wired communications device involves including a frame boundary bit sequence and a random data sequence as a preamble of a bit stream, encoding the bit stream into an encoded bit stream, and transmitting the encoded bit stream using the wired communications device.

18 Claims, 11 Drawing Sheets

(56) References Cited

OTHER PUBLICATIONS

Beruto, Piergiorgio et al.; "Canova Tech—The Art of Silicon Sculpting"; IEEE802.3cg TF, T1S scrambler proposal, Mar. 28, 2018; 14 pgs.

Final Rejection for U.S. Appl. No. 15/967,030, 16 pgs. (dated Feb. 19, 2020).

Yu, J. et al. "10BASE-T1S Scrambler Analysis", IEEE 802.3cg ad hoc Meeting, retreived from the internet at Jul. 23, 2019: URL:http://www.ieee802.org/3/cg/public/adhoc/ AlternateScrambleScheme_20180228.pdf, 28 pgs (Feb. 28, 2018).

Non-Final Rejection for U.S. Appl. No. 15/967,030, 14 pgs. (dated Jul. 7, 2020).

Final Rejection for U.S. Appl. No. 15/967,030, 16 pgs., dated Oct. 19, 2020.

Non-Final Rejection for U.S. Appl. No. 15/967,030, 14, pgs. (dated Mar. 10, 2021).

Notice of Allowance for U.S. Appl. No. 15/967,030, 10 pgs., (dated Jul. 7, 2021).

\* cited by examiner

WIRED COMMUNICATIONS DEVICE AND METHOD FOR OPERATING A WIRED COMMUNICATIONS DEVICE

BACKGROUND

In wired communications networks, an outgoing frame preamble may contain a repeating bit sequence, which is used for receiver clock synchronization purposes. However, if an outgoing frame preamble having a repeating bit sequence is not scrambled, an undesired common mode signal, which is an identical analog signal component on both negative and positive terminals, may be present at the wired connection. For example, if a preamble of an Ethernet frame having a repeating sequence of 55 55 55 55 55 55 55 is not scrambled, a repeated tone can be present at a power spectral density (PSD) of a transmitted signal. Because a wired network has a finite mode conversion value, a common mode signal (emission) may appear when a wire line is driven by a differential signal.

SUMMARY

Embodiments of a method and a device are disclosed. In an embodiment, a method for operating a wired communications device involves including a frame boundary bit sequence and a random data sequence as a preamble of a bit stream, encoding the bit stream into an encoded bit stream, and transmitting the encoded bit stream using the wired communications device. Other embodiments are also described.

In an embodiment, the frame boundary bit sequence includes a start of stream delimiter (SSD).

In an embodiment, the frame boundary bit sequence is encoded differently from a remaining portion of the preamble of the bit stream.

In an embodiment, the method further involves generating the random data sequence using a linear feedback shift register (LFSR).

In an embodiment, the method further involves generating the random data sequence based on a noise within the wired communications device.

In an embodiment, including the frame boundary bit sequence and the random data sequence as the preamble of the bit stream involves selecting one of the frame boundary bit sequence, the random data sequence, and the bit stream as an output of a multiplexer.

In an embodiment, encoding the bit stream into the encoded bit stream involves encoding the bit stream into the encoded bit stream using differential Manchester encoding.

In an embodiment, the bit stream is an Ethernet packet.

In an embodiment, the wired communications device is an Ethernet communications device.

In an embodiment, transmitting the encoded bit stream using the wired communications device involves transmitting the encoded bit stream in differential signals using the wired communications device.

In an embodiment, a wired communications device includes a bit manipulating unit configured to include a frame boundary bit sequence and a random data sequence as a preamble of a bit stream, an encoder configured to encode the bit stream into an encoded bit stream, and a transmitter unit configured to transmit the encoded bit stream using the wired communications device.

In an embodiment, the frame boundary bit sequence includes an SSD.

In an embodiment, the frame boundary bit sequence is encoded differently from a remaining portion of the preamble of the bit stream.

In an embodiment, the bit manipulating unit comprises a random data generator configured to generate the random data sequence using a LFSR.

In an embodiment, the bit manipulating unit includes a random data generator configured to generate the random data sequence based on a noise within the wired communications device.

In an embodiment, the bit manipulating unit includes a multiplexer configured to select one of the frame boundary bit sequence, the random data sequence, and the bit stream as an output of a multiplexer.

In an embodiment, the encoder is further configured to encode the bit stream into the encoded bit stream using differential Manchester encoding.

In an embodiment, the wired communications device is an Ethernet communications device.

In an embodiment, the transmitter unit is further configured to transmit the encoded bit stream in differential signals using the wired communications device.

In an embodiment, a method for operating an Ethernet device involves including an SSD and a random data sequence as a preamble of an Ethernet packet, encoding the Ethernet packet into an encoded Ethernet packet, and transmitting the encoded Ethernet packet in differential signals using the Ethernet device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
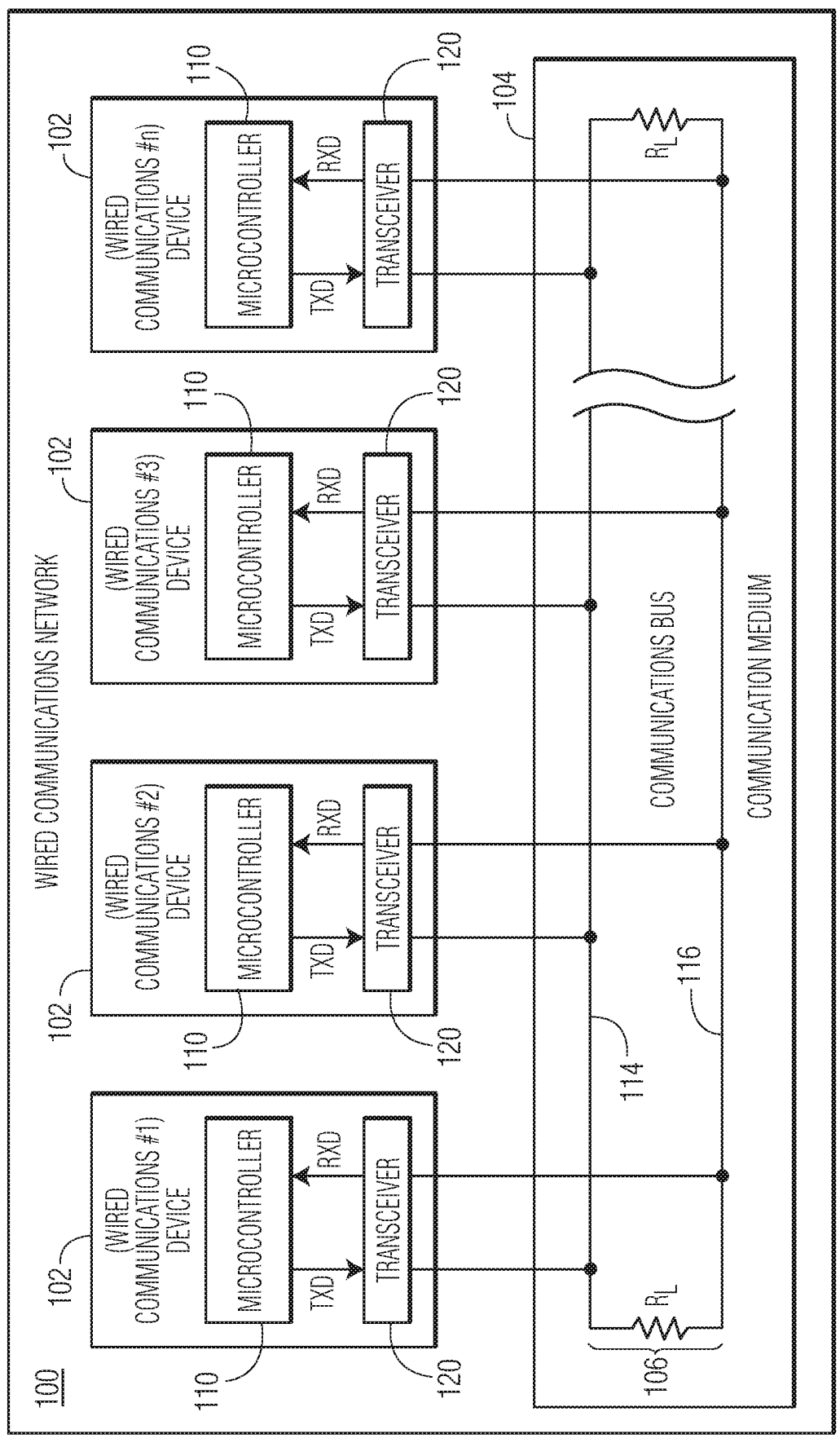
FIG. 1 depicts a wired communications network that includes multiple wired communications devices.

FIG. 1 depicts a wired communications network 100 that includes multiple wired communications devices 102 (n being an integer that is greater than one). In the embodiment of FIG. 1, each wired communications device includes a microcontroller 110 and a transceiver 120. In some embodiments, the microcontrollers are connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. The wired communications network may be any suitable type of wired network. In some embodiments, the wired communications network is an Ethernet network. Although in some embodiments a specific type of network is described, it should be noted that the invention is not restricted to a specific type of network.

In some embodiments, the wired communications network 100 is an in-vehicle network (IVN), which can be used for communications within a vehicle. The wired communications network may be any type of in-vehicle networks (IVNs), including a Controller Area Network (CAN), a Local Interconnect Network (LIN), a Media Oriented Systems Transport (MOST) network, a FlexRay™ compatible network, and other types of IVNs. The wired communications network can be used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more.

The microcontrollers 110 can implement data link layer operations as is known in the field, which include Logical Link Control (LLC) sublayer operations and/or media access control (MAC) sublayer operations. For example, in a receive operation, a microcontroller stores received serial bits from a corresponding transceiver 120. In a transmit operation, the microcontroller may transmit a message as serial bits in a data frame format to the corresponding transceiver. The microcontrollers may be implemented by, for example, digital signal processors (DSPs) or central processing units (CPUs). In some embodiments, at least one of the microcontrollers includes a host (not shown), which may be, for example, a software application that is stored in memory of the microcontroller and executed by processing circuits of the microcontroller. As illustrated in FIG. 1, data communicated from a microcontroller to a corresponding transceiver is identified as transmit data (TXD) and data communicated from a transceiver to a corresponding microcontroller is referred to as receive data (RXD). Throughout the description, TXD is carried on a TXD path and RXD is carried on an RXD path.

The transceivers 120 are located between the microcontrollers 110 and a communications medium 104 and implement physical layer operations. For example, in receive operations, a transceiver converts analog signals (e.g., analog differential signals) from the communications medium to digital signals that a corresponding microcontroller can interpret. The transceiver also can protect the microcontroller from extreme electrical conditions on the communications medium, e.g., electrical surges. In transmit operations, the transceiver converts digital bits received from the microcontroller into analog differential signals that are sent on the communications medium. The transceivers may be any suitable type of transceivers. In some embodiments, the transceivers are Ethernet transceivers. For example, the transceivers may be Institute of Electrical and Electronics Engineers (IEEE) 802.3 compatible Ethernet transceivers. The transceivers may be implemented in suitable logical circuits and/or analog circuits.

In the wired communications network 100 depicted in FIG. 1, the wired communications devices 102 are connected to the communications medium 104, which carries analog signals between the wired communications devices. The communications medium may include one or more conductive wires or lines, which are made of conductive materials (e.g., metals). For example, the communications medium may include one or more coaxial cables, twisted pair cables, or fiber optic cables.

In some embodiments, the communications medium includes a communications bus 106, which carries analog differential signals and includes a high bus line 114 and a low bus line 116, which may be connected between one or more resistors, "$R_L$." Data is communicated to and from the communications bus via the bus lines 114 and 116, respectively. However, the network topology of the wired communications network is not limited to bus topology. Examples of the network topology that can also be used by the wired communications network includes point-to-point, star, ring or circular, mesh, tree, hybrid, and daisy chain, which are known in the field.

In wired communications networks, an outgoing frame preamble may contain a repeating bit sequence, which is used for receiver clock synchronization purposes. For example, an Ethernet frame preamble can contain a repeating sequence of 55 55 55 55 55 55 55 for receiver clock synchronization. However, if an outgoing frame preamble having a repeating bit sequence is not scrambled, an undesired common mode signal, which is an identical analog signal component on both negative and positive terminals, may be present at the wired connection. For example, if a preamble of an Ethernet frame having a repeating sequence of 55 55 55 55 55 55 55 is not scrambled, a repeated tone can be present at a power spectral density (PSD) of a transmitted signal. Because a wired network has a finite mode conversion value in which energy is transformed from one form to another form between materials of different impedances, a common mode signal (emission) may appear when a wire line is driven by a differential signal.

In accordance with an embodiment of the invention, a method for operating a wired communications device involves including a frame boundary bit sequence and a random data sequence as a preamble of a bit stream, encoding the bit stream into an encoded bit stream, and transmitting the encoded bit stream using the wired communications device. By including the frame boundary bit sequence and the random data sequence as the preamble of the bit stream to be encoded and transmitted, a predefined repeating bit sequence is no longer needed as the preamble of the bit stream to be transmitted. Consequently, an undesired common mode signal at a corresponding receiver is reduced without scrambling the preamble of the bit stream. In addition, using the random data sequence as the preamble of the bit stream to be transmitted can further reduce an undesired common mode signal at a corresponding receiver without scrambling the preamble of the bit stream.

Figure 2:
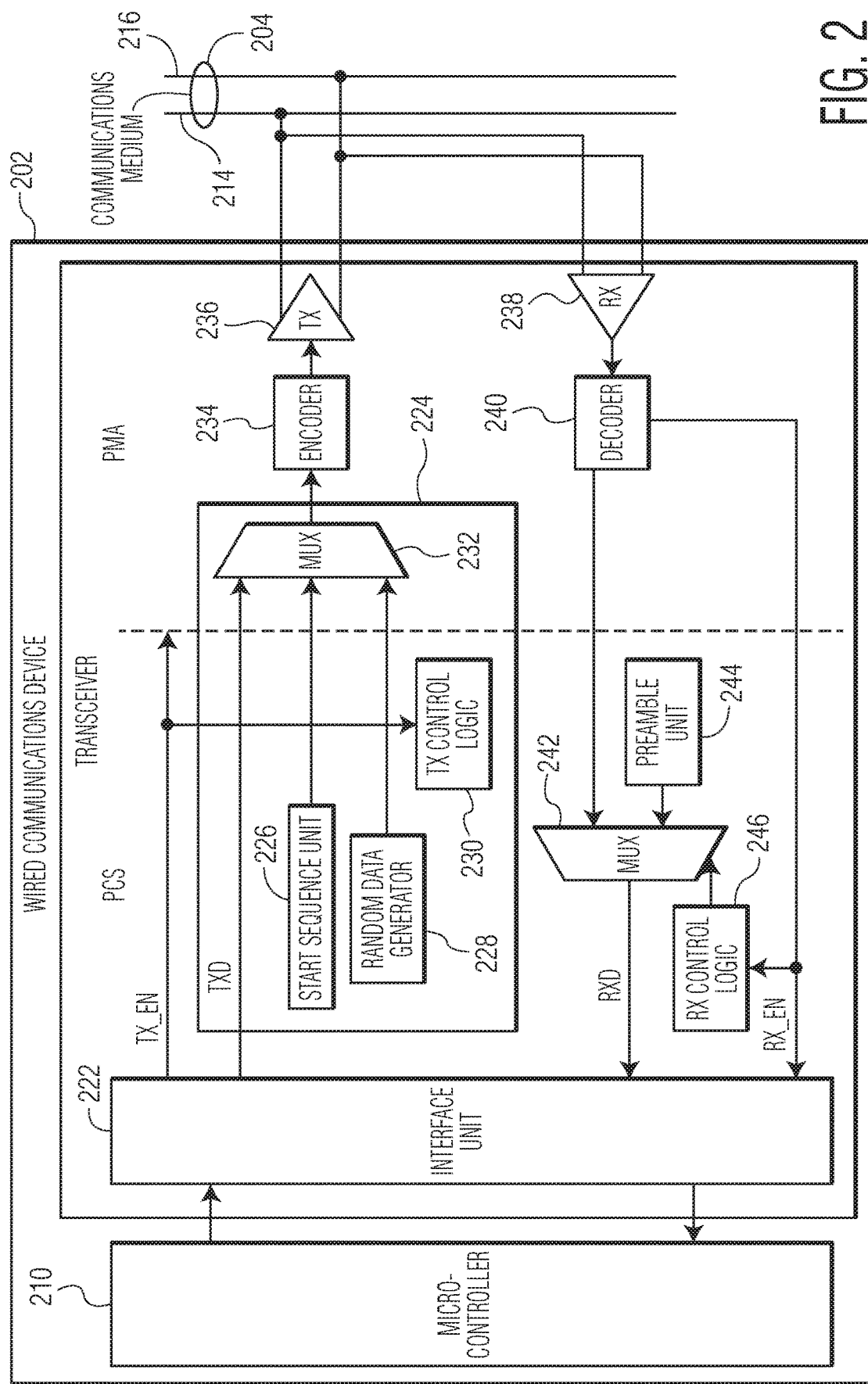
FIG. 2 depicts a wired communications device in which a frame boundary bit sequence and a random data sequence are included as a preamble of a bit stream.

FIG. 2 depicts a wired communications device 202 in which a frame boundary bit sequence and a random data sequence are included as a preamble of a bit stream. The wired communications device depicted in FIG. 2 is an embodiment of the wired communications devices 102 depicted in FIG. 1. However, the wired communications devices depicted in FIG. 1 are not limited to the embodiment shown in FIG. 2. In the embodiment depicted in FIG. 2, the wired communications device 202 includes a microcontroller 210 that implements Logical Link Control (LLC) sublayer operations and media access control (MAC) sublayer operations and a transceiver 220 that implements physical layer operations. The microcontroller 210 and the transceiver 220 depicted in FIG. 2 are embodiments of the microcontroller 110 and the transceiver 120 depicted in FIG. 1. Although the illustrated wired communications device is shown with certain components and described with certain functionality herein, other embodiments of the wired communications device may include fewer or more components to implement the same, less, or more functionality.

The microcontrollers 210 can implement data link layer operations as is known in the field. For example, in a receive operation, the microcontroller stores received serial bits from the transceiver 220. In a transmit operation, the microcontroller may transmit a message as serial bits in a data frame format to the transceiver.

In the embodiment depicted in FIG. 2, the transceiver 220 includes an interface unit 222, a bit manipulating unit 224, which includes a start sequence unit 226, a random data generator 228, a transmitter (TX) control logic 230, and a first multiplexer (MUX) 232, an encoder 234, a transmitter unit (TX) 236, a receiver unit (RX) 238, a decoder 240, a second multiplexer 242, a preamble unit 244, and a receiver (RX) control logic 246. In some embodiments, the interface unit, the start sequence unit, the random data generator, the transmitter control logic, the receiver control logic, the second multiplexer, and the preamble unit are included in a physical coding sublayer (PCS) and the first multiplexer, the encoder, the transmitter unit, the decoder, and the receiver unit are included in a physical medium attachment (PMA).

The interface unit 222 is configured to receive transmit data (TXD) communicated from the microcontroller 210 and to transmit receive data (RXD) to the microcontroller. In some embodiments, the interface unit is a media independent interface (MII) that receives data communicated from the microcontroller and transmits data to the microcontroller, independent from the type of a communications medium 204, which may be an embodiment of the communications medium 104 depicted in FIG. 1. The interface unit may be implemented in suitable logical circuits (e.g., registers) and/or analog circuits.

The start sequence unit 226 is configured to provide (e.g., to generate or to store) a starting bit sequence for a bit stream to be transmitted. The starting bit sequence may be encoded differently from the rest of a preamble of the bit stream, for example, to indicate to a corresponding receiver the start of a physical layer frame for synchronization purpose. In some embodiments, the start sequence unit is configured to generate a start of stream delimiter (SSD) that indicates the start of a physical layer stream. The SSD may be encoded differently from the rest of the preamble, which indicates to a corresponding receiver the start of an Ethernet frame for synchronization purposes. In some embodiments, the SSD is an octet long and is used to replace the first octet of a MAC frame, e.g., an IEEE 802.3 compatible MAC frame. The start sequence unit may be implemented in suitable logical circuits and/or analog circuits. In some embodiments, the start sequence unit includes a storage device such as memory (e.g., a random access memory (RAM) or a read-only memory (ROM)) or cache.

The random data generator 228 is configured to generate a random data sequence for a bit stream to be transmitted. In some embodiments, the random data generator is configured to generate the random data sequence using a linear feedback shift register (LFSR). In some embodiments, the random data generator is configured to generate the random data sequence using on-chip thermal noise or random noise of one or more DSP blocks. The random data generator may be implemented in suitable logical circuits and/or analog circuits. In some embodiments, the random data generator includes a storage device such as memory (e.g., a RAM or a ROM) or cache.

The transmitter control logic 230 is configured to control the first multiplexer 232. In the embodiment depicted in FIG. 2, the transmitter control logic controls the first multiplexer to include a frame boundary bit sequence and a random data sequence as a preamble of a bit stream. By including the frame boundary bit sequence and the random data sequence as the preamble of the bit stream to be encoded and transmitted, a predefined repeating bit sequence is no longer needed as the preamble of the bit stream to be transmitted. Consequently, an undesired common mode signal at a corresponding receiver is reduced without the need of scrambling the preamble of the bit stream. In addition, using the random data sequence as the preamble of the bit stream to be transmitted can further reduce an undesired common mode signal at a corresponding receiver without the need of scrambling the preamble of the bit stream. The transmitter control logic may be implemented in suitable logical circuits and/or analog circuits. In some embodiments, the transmitter control logic is implemented as a processor, such as a microcontroller or a CPU.

The first multiplexer 232 is configured to select one of transmit data (TXD), which is data communicated from the microcontroller 210 to the transceiver 220, a starting bit sequence that is provided by the start sequence unit 226, and a random data sequence that is provided by the random data generator 228 as an output. In some embodiments, the first multiplexer is used to implement a Boolean function.

The encoder 234 is configured to encode the output data from the first multiplexer 232. The encoder may be implemented in suitable logical circuits and/or analog circuits. The encoder may implement various types of encoding schemes. Examples of encoding schemes that can be implemented by the encoder include, without being limited to, Manchester encoding (e.g., differential Manchester encoding), pulse amplitude modulation (PAM) encoding, and Non-return-to-zero (NRZ) encoding. In some embodiments, the encoder is a differential Manchester encoder (DME) as is known in the field. For example, the encoder combines data and clock signals to form a single 2-level self-synchronizing data stream.

The transmitter unit (TX) 236 is configured to transmit encoded data through the communications medium 204. The transmitter unit may be implemented in suitable logical circuits and/or analog circuits. In the embodiment depicted in FIG. 2, the transmitter unit is configured to transmit data through lines/wires 214, 216 of the communications medium 204, which may be a communications bus. In some embodiments, the transmitted data is in the form of differential signals (e.g., differential Ethernet signals over twisted pair cabling).

The receiver unit (RX) 238 is configured to receive data from the communications medium 204. The receiver unit may be implemented in suitable logical circuits and/or analog circuits. In the embodiment depicted in FIG. 2, the receiver unit is configured to receive data from the lines/wires 214, 216 of the communications medium 204, which may be a communications bus. In some embodiments, the received data is in the form of differential signals (e.g., differential Ethernet signals over twisted pair cabling).

The decoder 240 is configured to decode the output data from the receiver unit 238. The decoder may be implemented in suitable logical circuits and/or analog circuits. The decoder may implement various types of decoding schemes. Examples of decoding schemes that can be implemented by the decoder include, without being limited to, Manchester decoding (e.g., differential Manchester decoding), pulse amplitude modulation (PAM) decoding, and Non-return-to-zero (NRZ) decoding. In some embodiments, the decoder is a differential Manchester decoder (DMD) that is known in the field.

The preamble unit 244 is configured to provide (e.g., to generate or to store) a preamble for a received bit stream such that the received bit stream can be processed by the microcontroller 210. For example, the preamble unit can provide a MAC preamble for a received bit stream such that the received bit stream can be processed by a MAC controller or a MAC controller function within the microcontroller. The preamble unit may be implemented in suitable logical circuits and/or analog circuits. In some embodiments, the preamble unit includes a storage device such as memory (e.g., a RAM or a ROM) or cache.

The second multiplexer 242 is configured to select one of a preamble that is provided by the preamble unit 244 or a decoded bit stream from the decoder 240 as an output. In the embodiment depicted in FIG. 2, the output of the second multiplexer is receive data (RXD), which is data communicated from the transceiver 220 to the microcontroller 210 through the interface unit. In some embodiments, the second multiplexer is used to implement a Boolean function.

The receiver control logic 246 is configured to control the second multiplexer 242. The receiver control logic may be implemented in suitable logical circuits and/or analog circuits. In some embodiments, the receiver control logic is implemented as a processor, such as a microcontroller or a CPU.

In an example operation of the transceiver 220, when there is data to be transmitted from the microcontroller 210, a signal, "TX_EN," is asserted via the interface unit 222. The physical coding sublayer (PCS) (e.g., the transmitter control logic 230) counts the number of bytes received from the interface unit and inserts a start of stream delimiter (SSD) into a bit stream (e.g., by instructing the first multiplexer to output the SSD from the start sequence unit). The size of SSD is design specific. In some embodiments, the SSD is encoded differently from the rest of the preamble, which indicates to a corresponding receiver the start of an Ethernet frame for synchronization purposes. After the SSD is inserted into the bit stream, the remaining field of the preamble of the bit stream is filled with a random sequence from the random data generator (e.g., by instructing the first multiplexer 232 to output the random sequence from the random data generator unit 228). Subsequently, the bit stream is encoded using the encoder 234 and is transmitted as differential signals using the transmitter unit 236.

In another example operation of the transceiver 220, when there is data to be received from the receiver unit 238 as differential signals, a signal, "RX_EN," is asserted to the interface unit 222, for example, through the decoder 240. The physical coding sublayer (PCS) (e.g., the receiver control logic) counts the number of bytes received from the receiver unit and inserts a preamble into a bit stream (e.g., by instructing the second multiplexer to output a preamble from the preamble unit 244). After the preamble is inserted into the bit stream, the bit stream is sent to the interface unit (e.g., by instructing the second multiplexer to output the decoded data from the decoder).

Figure 3:
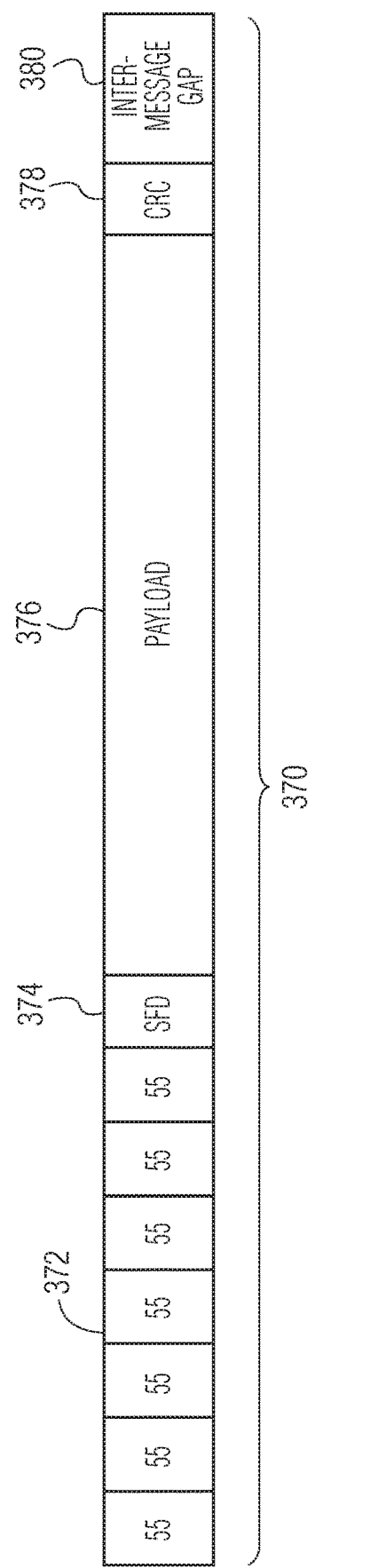
FIG. 3 depicts the format of a message structure for wired communications.

FIG. 3 depicts the format of a message structure 370 for wired communications. The message structure depicted in FIG. 3 may be an Ethernet packet or any other type of message structure for wired communications. As depicted in FIG. 3, the message structure includes a preamble 372 having a repeating sequence of 55 55 55 55 55 55 55, a start frame delimiter (SFD) 374, a payload 376, a Cyclic Redundancy Check (CRC) field 378, and an inter-message gap 380. In some embodiments, the preamble has a size of 7 octets, each including 8 bits. In some embodiments, the SFD has a size of 1 octet. In some embodiments, the payload has a size between 46 octets and 1500 octets. In some embodiments, the CRC field has a size of 4 octets. In some embodiments, the inter-message gap has a size of 12 octets. In some embodiments, the message structure further includes a MAC destination address, a MAC source address, and a message type field or message length field (e.g., an Ethertype field or an Ethernet packet length field). The inter-message gap may be a minimum idle period between transmission of adjacent messages, such as, a minimum idle period between transmission of Ethernet packets known as the interpacket gap (IPG), interframe spacing, or interframe gap (IFG).

Figure 4:
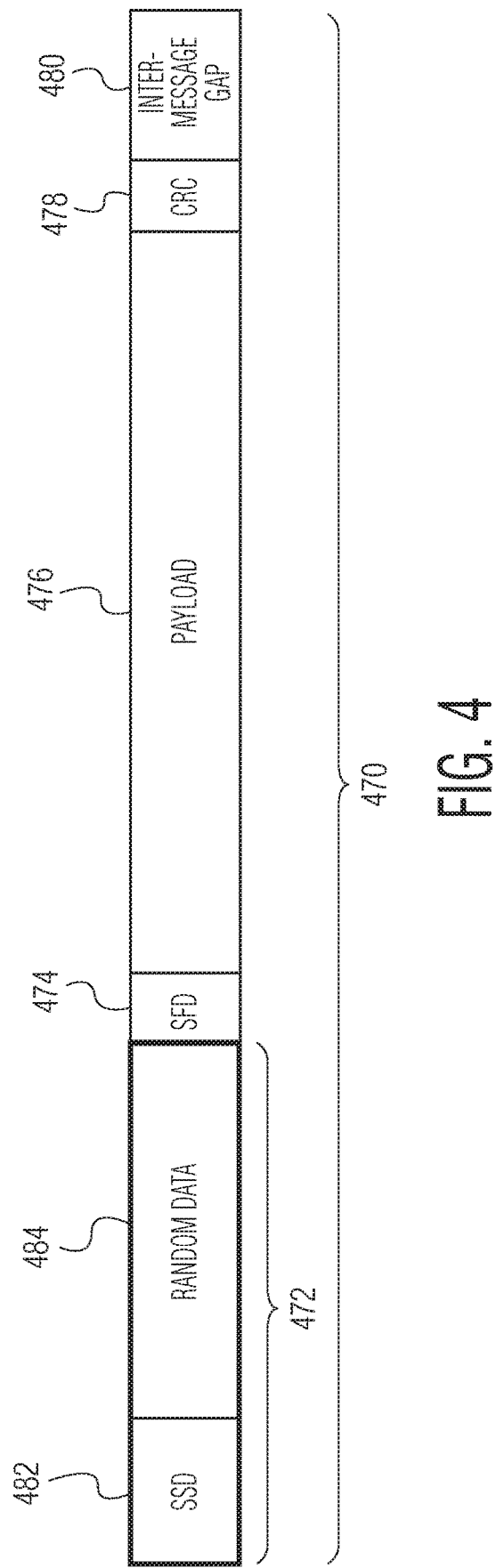
FIG. 4 depicts the format of a message structure that is produced by a transceiver of the wired communications device depicted in FIG. 2.

FIG. 4 depicts the format of a message structure 470 that is produced by the transceiver 220 depicted in FIG. 2. The message structure depicted in FIG. 4 may be an Ethernet packet or any other type of message structure for wired communications. As depicted in FIG. 4, the message structure includes a preamble 472 having a start of stream delimiter (SSD) 482 and a random data sequence 484, a start frame delimiter (SFD) 474, a payload 476, a Cyclic Redundancy Check (CRC) field 478, and an inter-message gap 480. The difference between the message structure 470 depicted in FIG. 4 and the message structure 370 depicted in FIG. 3 is that the SSD 482 and the random data sequence 484 replace the repeating sequence of 55 55 55 55 55 55 55. In some embodiments, the message structure further includes a MAC destination address, a MAC source address, and a message type field or message length field (e.g., an Ethertype field or an Ethernet packet length field). The inter-message gap may be a minimum idle period between transmission of adjacent messages, such as, a minimum idle period between transmission of Ethernet packets known as the interpacket gap (IPG), interframe spacing, or interframe gap (IFG). By including the SSD and the random data sequence as the preamble of the message structure to be transmitted, the predefined repeating bit sequence of 55 55 55 55 55 55 55 is no longer needed as the preamble of the message structure to be transmitted. Consequently, an undesired common mode signal at a corresponding receiver is reduced without scrambling the preamble of the bit stream. In addition, using the random data sequence as the preamble of the message structure to be transmitted can further reduce an undesired common mode signal at a corresponding receiver scrambling the preamble of the bit stream.

For a message structure having a relatively small payload, including a starting bit frequency (e.g., an SSD) and a random data sequence as the preamble of the message structure to be transmitted can reduce the emission (i.e., an undesired common mode signal at a corresponding receiver). For example, for a packet with 87 bytes of payload, including random preamble content can reduce the emission by around 5 dB. However, for a message structure having a relatively long payload, including a starting bit frequency and a random data sequence as the preamble of the message structure to be transmitted may cause an undesired peak power spectral density (PSD) of a transmitted signal.

In accordance with an embodiment of the invention, a method for operating a wired communications device involves performing a bit mapping operation on an input bit stream to generate a mapped bit stream, performing a bit scrambling operation in response to the mapped bit stream to generate a scrambled bit stream, generating an encoded bit stream in response to the scrambled bit stream, and transmitting the encoded bit stream using the wired communications device. By performing the bit scrambling operation after performing the bit mapping operation, an undesired common mode signal at a corresponding receiver is reduced.

Figure 5:
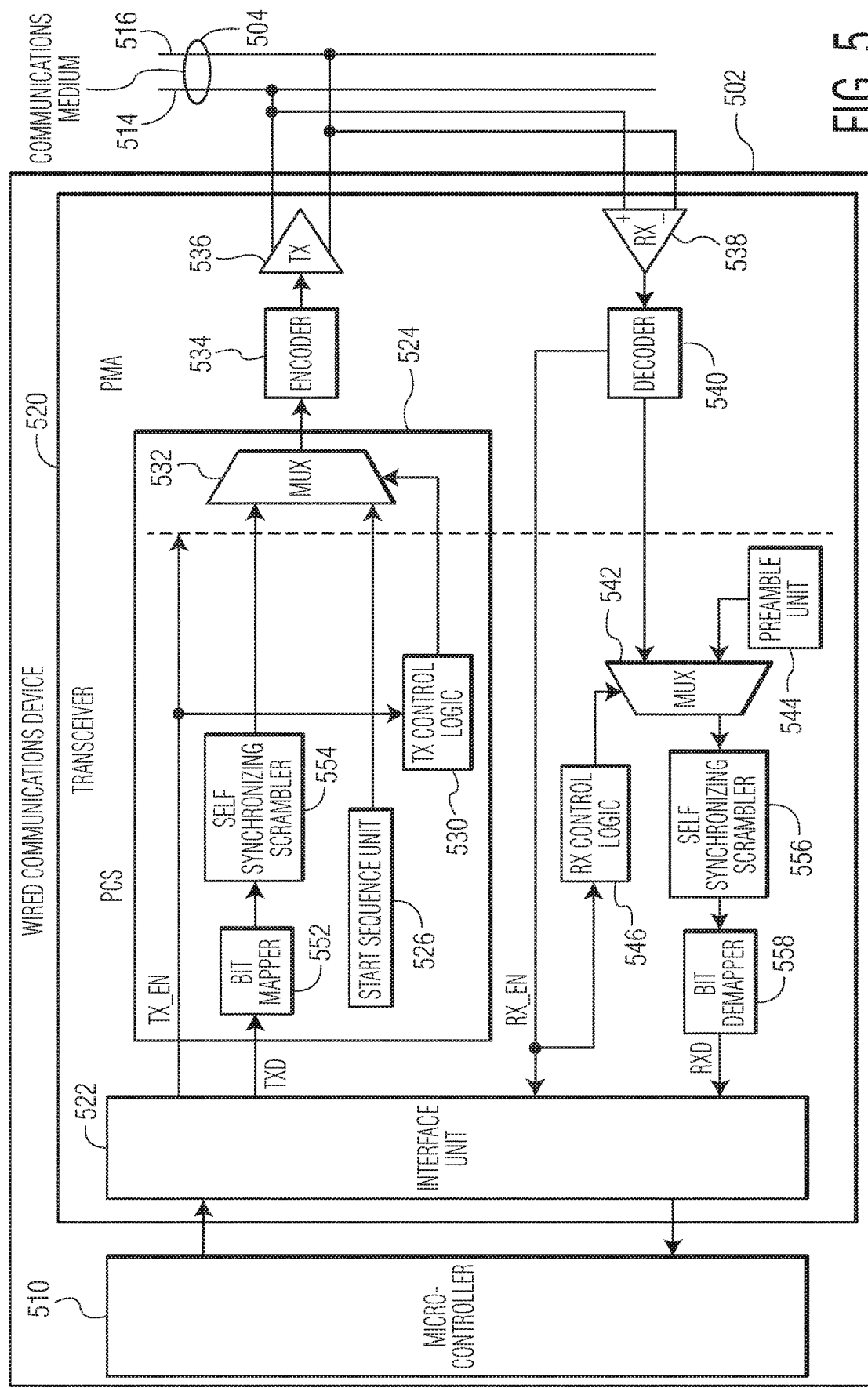
FIG. 5 depicts a wired communications device in accordance with an embodiment of the invention in which a bit scrambling operation is performed after a bit mapping operation is performed.

FIG. 5 depicts a wired communications device 502 in accordance with an embodiment of the invention in which a bit scrambling operation is performed after a bit mapping operation is performed. The wired communications device depicted in FIG. 5 is an embodiment of the wired communications devices 102 depicted in FIG. 1. However, the wired communications devices depicted in FIG. 1 are not limited to the embodiment shown in FIG. 5. In the embodiment depicted in FIG. 5, the wired communications device 502 includes a microcontroller 510 that implements Logical Link Control (LLC) sublayer operations and media access control (MAC) sublayer operations and a transceiver 520 that implements physical layer operations. The microcontroller 510 and the transceiver 520 depicted in FIG. 5 are embodiments of the microcontroller 110 and the transceiver 120 depicted in FIG. 1. Although the illustrated wired communications device is shown with certain components and described with certain functionality herein, other embodiments of the wired communications device may include fewer or more components to implement the same, less, or more functionality.

The microcontroller 510 can implement data link layer operations as is known in the field. For example, in a receive operation, the microcontroller stores received serial bits from the transceiver 520. In a transmit operation, the microcontroller may transmit a message as serial bits in a data frame format to the transceiver.

In the embodiment depicted in FIG. 5, the transceiver 520 includes an interface unit 522, a bit manipulating unit 524, which includes a bit mapper 552, a self synchronizing scrambler 554, a start sequence unit 526, a transmitter (TX) control logic 530, and a first multiplexer (MUX) 532, an encoder 534, a transmitter unit (TX) 536, a receiver unit (RX) 538, a decoder 540, a second multiplexer 542, a preamble unit 544, a self synchronizing descrambler 556, a bit demapper 558, and a receiver (RX) control logic 546. In some embodiments, the interface unit, the bit mapper, the self synchronizing scrambler, the start sequence unit, the transmitter control logic, the receiver control logic, the second multiplexer, the preamble unit, the self synchronizing descrambler, and the bit demapper are included in a physical coding sublayer (PCS) and the first multiplexer, the encoder, the transmitter unit, the decoder, and the receiver unit are included in a physical medium attachment (PMA).

The interface unit 522 is configured to receive transmit data (TXD) communicated from the microcontroller 510 and to transmit receive data (RXD) to the microcontroller. In some embodiments, the interface unit is a media independent interface (MII) that receives data communicated from the microcontroller and transmits data to the microcontroller, independent from the type of a communications medium 504, which may be an embodiment of the communications medium 104. The interface unit may be implemented in suitable logical circuits (e.g., registers) and/or analog circuits.

The bit mapper 552 is configured to perform a bit mapping operation on an input bit stream to generate a mapped bit stream. In an embodiment, the bit mapper is configured to map groups of a first number of bits of data in the input bit stream to groups of a second number of bits in the mapped bit stream, where the first number is different from the second number. In some embodiments, the first number is smaller than the second number. In some embodiments, the bit mapper is configured to map a first data word in the input bit stream to a second data word of the mapped bit stream, where the first and second data words have different number of bits. In some embodiments, the first data word has less number of bits than the second data word. In some embodiments, the bit mapper is a 4B5B bit mapper that maps a 4-bit data word in the input bit stream to a 5-bit data word in the mapped bit stream. The 5-bit data words may be pre-determined in a dictionary and chosen to ensure that there will be sufficient transitions in the line state to produce a self-clocking signal. The bit mapper may be implemented in suitable logical circuits and/or analog circuits. In some embodiments, the bit mapper includes a storage device such as memory (e.g., a RAM or a ROM) or cache.

The self synchronizing scrambler 554 is configured to perform a bit scrambling operation on the mapped bit stream from the bit mapper 552 to generate a scrambled bit stream. By performing the bit scrambling operation after performing the bit mapping operation, an undesired common mode signal at a corresponding receiver is reduced. The self synchronizing scrambler can be used to change a data sequence to a more random sequence. The self synchronizing scrambler does not need an agreed scrambler seed between the wired communications device 502 and a corresponding communications device. In some embodiments, the self synchronizing scrambler is a multiplicative scrambler that is configured to perform a multiplication between an input signal and the scrambler transfer function in the z-domain. In some embodiments, no restriction is placed on defining an initial seed of the self synchronizing scrambler. In some embodiments, the self synchronizing scrambler is configured to perform a bit scrambling operation in response to a mapped bit stream to generate a scrambled bit stream using a scrambling seed. In these embodiments, a receiver communications device that receives the encoded bit stream uses the scrambling seed for descrambling the encoded bit stream. The self synchronizing scrambler may be implemented in suitable logical circuits and/or analog circuits. In some embodiments, the self synchronizing scrambler includes a storage device such as memory (e.g., a RAM or a ROM) or cache.

Figure 6:
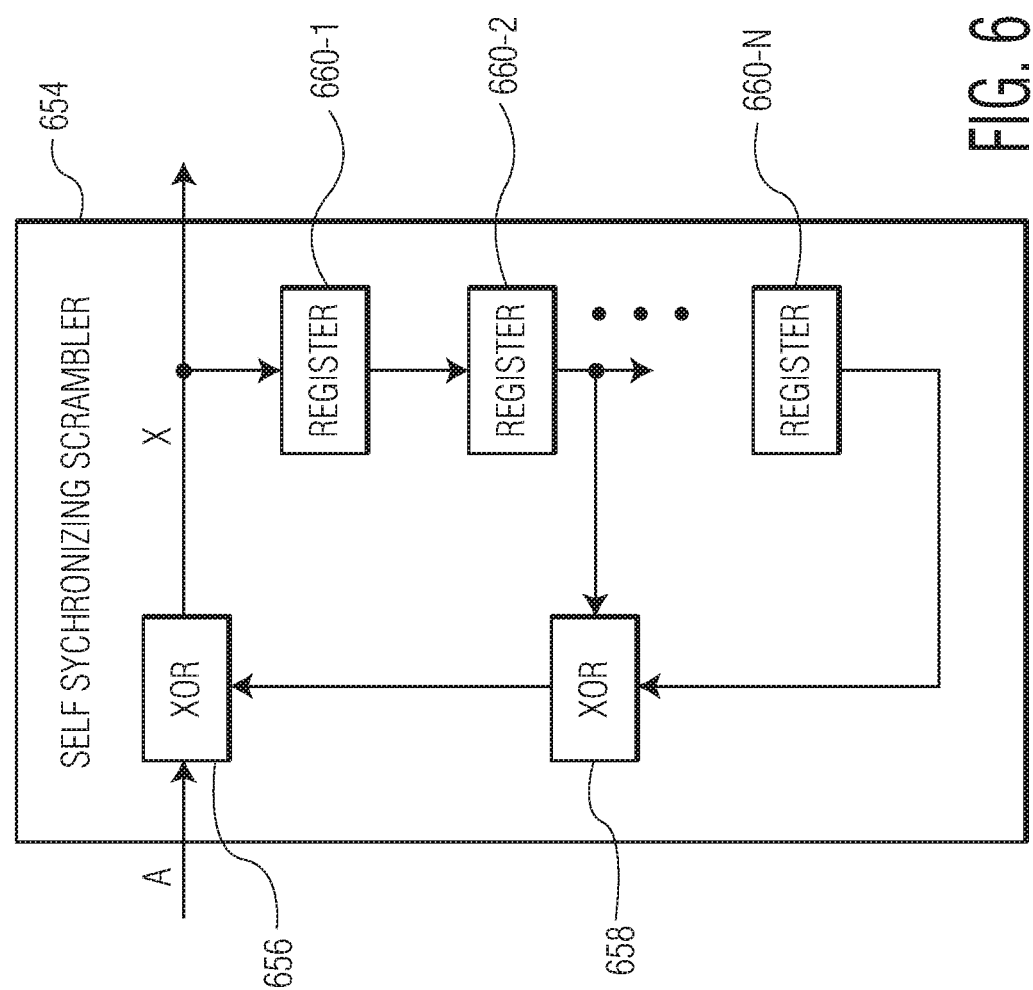
FIG. 6 depicts an embodiment of a self synchronizing scrambler of the wired communications device depicted in FIG. 5.

FIG. 6 depicts an embodiment of the self synchronizing scrambler 554 depicted in FIG. 5. In the embodiment depicted in FIG. 6, a self synchronizing scrambler 654 includes a first XOR logic 656, a second XOR logic 658, and multiple registers 660-1, 660-2, . . . , 660-N (N is an integer that is greater than 1). The self synchronizing scrambler is configured to perform a multiplication of an input signal, "A," by the transfer function in Z-space of the self synchronizing scrambler to generate an output signal, "X." Unlike an additive scrambler, the self synchronizing scrambler does not need the frame synchronization. The self synchronizing scrambler 654 depicted in FIG. 6 is an embodiment of the self synchronizing scrambler 554 depicted in FIG. 5. However, the self synchronizing scrambler 554 depicted in FIG. 5 is not limited to the embodiment shown in FIG. 6. Although the illustrated self synchronizing scrambler 654 is shown with certain components and described with certain functionality herein, other embodiments of the self synchronizing scrambler may include fewer or more components to implement the same, less, or more functionality.

Turning back to FIG. 5, the start sequence unit 526 is configured to provide (e.g., to generate or to store) a starting bit sequence for a bit stream to be transmitted. The starting bit sequence may be encoded differently from the rest of a preamble of the bit stream, for example, to indicate to a corresponding receiver the start of a physical layer frame for synchronization purpose. In some embodiments, the start sequence unit is configured to generate a start of stream delimiter (SSD) that indicates the start of a physical layer stream. The SSD may be encoded differently from the rest of the preamble, which indicates to a corresponding receiver the start of an Ethernet frame for synchronization purposes. In some embodiments, the SSD is an octet long and is used to replace the first octet of a MAC frame, e.g., an IEEE 802.3 compatible MAC frame. The start sequence unit may be implemented in suitable logical circuits and/or analog circuits. In some embodiments, the start sequence unit includes a storage device such as memory (e.g., a RAM or a ROM) or cache.

The transmitter control logic 530 is configured to control the first multiplexer 532. In the embodiment depicted in FIG. 5, the transmitter control logic controls the first multiplexer to select one of scrambled data from the self synchronizing scrambler 554 and a starting bit sequence that is provided by the start sequence unit 526 as its output. The transmitter control logic may be implemented in suitable logical circuits and/or analog circuits. In some embodiments, the transmitter control logic is implemented as a processor, such as a microcontroller or a CPU.

The first multiplexer 532 is configured to select one of scrambled data from the self synchronizing scrambler 554 and a starting bit sequence that is provided by the start sequence unit 526 as an output. In some embodiments, the first multiplexer is used to implement a Boolean function.

The encoder 534 is configured to encode the output data from the first multiplexer 532. The encoder may be implemented in suitable logical circuits and/or analog circuits. The encoder may implement various types of encoding schemes. Examples of encoding schemes that can be implemented by the encoder include, without being limited to, Manchester encoding (e.g., differential Manchester encoding), pulse amplitude modulation (PAM) encoding, and Non-return-to-zero (NRZ) encoding. In some embodiments, the encoder is a differential Manchester encoder (DME) as is known in the field. For example, the encoder combines data and clock signals to form a single 2-level self-synchronizing data stream.

The transmitter unit (TX) 536 is configured to transmit encoded data through the communications medium 504. The transmitter unit may be implemented in suitable logical circuits and/or analog circuits. In the embodiment depicted in FIG. 5, the transmitter unit is configured to transmit signals through lines/wires 514, 516 of the communications medium, which may be a communications bus. In some embodiments, the transmitted data is in the form of differential signals (e.g., differential Ethernet signals over twisted pair cabling).

The receiver unit (RX) 538 is configured to receive data from the communications medium 504. The receiver unit may be implemented in suitable logical circuits and/or analog circuits. In the embodiment depicted in FIG. 5, the receiver unit is configured to receive data from the lines/wires 514, 516 of the communications medium 504, which may be a communications bus. In some embodiments, the received data is in the form of differential signals (e.g., differential Ethernet signals over twisted pair cabling).

The decoder 540 is configured to decode the output data from the receiver unit 538. The decoder may be implemented in suitable logical circuits and/or analog circuits. The decoder may implement various types of decoding schemes. Examples of decoding schemes that can be implemented by the decoder include, without being limited to, Manchester decoding (e.g., differential Manchester decoding), pulse amplitude modulation (PAM) decoding, and Non-return-to-zero (NRZ) decoding. In some embodiments, the decoder is a differential Manchester decoder (DMD) that is known in the field.

The preamble unit 544 is configured to provide (e.g., to generate or to store) a preamble for a received bit stream such that the received bit stream can be processed by the microcontroller 210. For example, the preamble unit can provide a MAC preamble for a received bit stream such that the received bit stream can be processed by a MAC controller or a MAC controller function within the microcontroller. The preamble unit may be implemented in suitable logical circuits and/or analog circuits. In some embodiments, the preamble unit includes a storage device such as memory (e.g., a RAM or a ROM) or cache.

The second multiplexer 542 is configured to select one of a preamble that is provided by the preamble unit 544 or a decoded bit stream from the decoder 540 as an output. In the embodiment depicted in FIG. 5, the output of the second multiplexer is used to derive receive data (RXD), which is data communicated from the transceiver 520 to the microcontroller 510 through the interface unit. In some embodiments, the second multiplexer is used to implement a Boolean function.

The receiver control logic 546 is configured to control the second multiplexer 542. The receiver control logic may be implemented in suitable logical circuits and/or analog circuits. In some embodiments, the receiver control logic is implemented as a processor, such as a microcontroller or a CPU.

The self synchronizing descrambler 556 is configured to performing a bit descrambling operation on the output data from the second multiplexer 542 to generate a descrambled bit stream. In some embodiments, the self synchronizing descrambler and the self synchronizing scrambler 554 have the same seed. The self synchronizing descrambler may be implemented in suitable logical circuits and/or analog circuits. In some embodiments, the self synchronizing scrambler includes a storage device such as memory (e.g., a RAM or a ROM) or cache.

Figure 7:
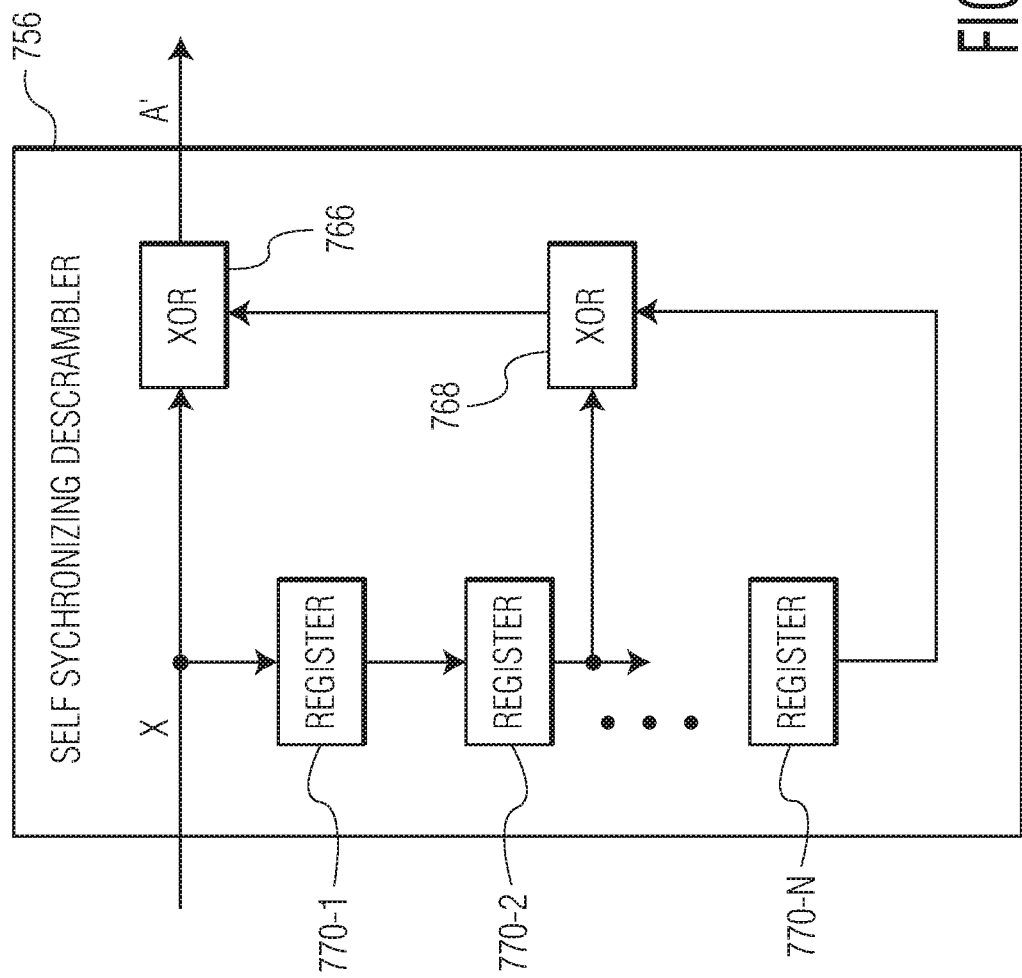
FIG. 7 depicts an embodiment of a self synchronizing descrambler of the wired communications device depicted in FIG. 5.

FIG. 7 depicts an embodiment of the self synchronizing descrambler 556 depicted in FIG. 5. In the embodiment depicted in FIG. 7, a self synchronizing descrambler 756 includes a first XOR logic 766, a second XOR logic 768, and multiple registers 770-1, 770-2, . . . , 770-N (N is an integer that is greater than 1). The self synchronizing descrambler is configured to process a signal, "X," to recover a signal, "A'." The self synchronizing descrambler 756 depicted in FIG. 7 is an embodiment of the self synchronizing descrambler 556 depicted in FIG. 5. However, the self synchronizing descrambler 556 depicted in FIG. 5 is not limited to the embodiment shown in FIG. 7. Although the illustrated self synchronizing descrambler is shown with certain components and described with certain functionality herein, other embodiments of the self synchronizing descrambler may include fewer or more components to implement the same, less, or more functionality.

Turning back to FIG. 5, the bit demapper 558 is configured to perform a bit demapping operation on an input bit stream from the self synchronizing descrambler 556 to generate a demapped bit stream. In an embodiment, the bit demapper is configured to map groups of a first number of bits of data in an input bit stream to groups of a second number of bits in the demapped bit stream, where the first number is different from the second number. In some embodiments, the first number is greater than the second number. In some embodiments, the bit demapper is configured to map a first data word in the input bit stream to a second data word of the demapped bit stream, where the first and second data words have different number of bits. In some embodiments, the first data word has more number of bits than the second data word. In some embodiments, the bit demapper is a 4B5B bit demapper that maps a 5-bit data word in the input bit stream to a 4-bit data word in the demapped bit stream. The bit demapper may be implemented in suitable logical circuits and/or analog circuits. In some embodiments, the bit demapper includes a storage device such as memory (e.g., a RAM or a ROM) or cache.

In an example operation of the transceiver 520, when there is data to be transmitted from the microcontroller 510, a signal, "TX_EN," is asserted via the interface unit 522. The physical coding sublayer (PCS) (e.g., the transmitter control logic 530) counts the number of bytes received from the interface unit and inserts a start of stream delimiter (SSD) into a bit stream (e.g., by instructing the first multiplexer 532 to output the SSD from the start sequence unit 526). The size of the SSD is design specific. Incoming 4-bit data word is mapped into 5-bit data word using the bit mapper 552 and the bit stream of 5-bit data word is scrambled using the self synchronizing scrambler 554. Because the SSD is not scrambled, the content of the self synchronizing scrambler does not have any restriction for an initial value. After the scrambling operation, output data from the first multiplexer is encoded using the encoder 534 and is transmitted as differential signals using the transmitter unit 536.

In another example operation of the transceiver 520, when there is data to be received from the receiver unit 538 as differential signals, a signal, "RX_EN," is asserted to the interface unit 522, for example, through the decoder 540. The physical coding sublayer (PCS) (e.g., the receiver control logic 546) counts the number of bytes received from the receiver unit and inserts a preamble into a bit stream (e.g., by instructing the second multiplexer 542 to output a preamble from the preamble unit 544). After the preamble is inserted into the bit stream, the bit stream is descrambled and demapped. The demapped bit stream is sent to the interface unit.

Figure 8:
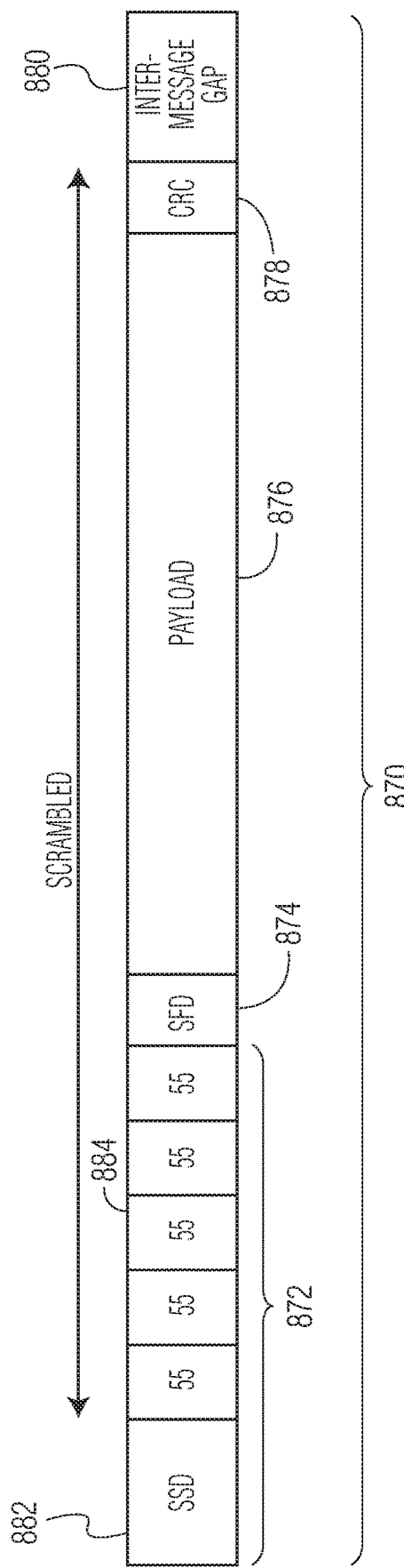
FIG. 8 depicts the format of a message structure that is produced by a transceiver of the wired communications device depicted in FIG. 5.

FIG. 8 depicts the format of a message structure 870 that is produced by the transceiver 520 depicted in FIG. 5. The message structure depicted in FIG. 8 may be an Ethernet packet or any other type of message structure for wired communications. As depicted in FIG. 8, the message structure includes a preamble 872 having a start of stream delimiter (SSD) 882 and a repeating sequence 884 of 55, 55, 55, 55, 55, a start frame delimiter (SFD) 874, a payload 876, a Cyclic Redundancy Check (CRC) field 878, and an inter-message gap 880. The repeating sequence of 55, 55, 55, 55, 55, the SFD, the payload, and the CRC field are scrambled. In some embodiments, the message structure further includes a MAC destination address, a MAC source address, and a message type field or message length field (e.g., an Ethertype field or an Ethernet packet length field). The inter-message gap may be a minimum idle period between transmission of adjacent messages, such as, a minimum idle period between transmission of Ethernet packets known as the interpacket gap (IPG), interframe spacing, or interframe gap (IFG).

Figure 9:
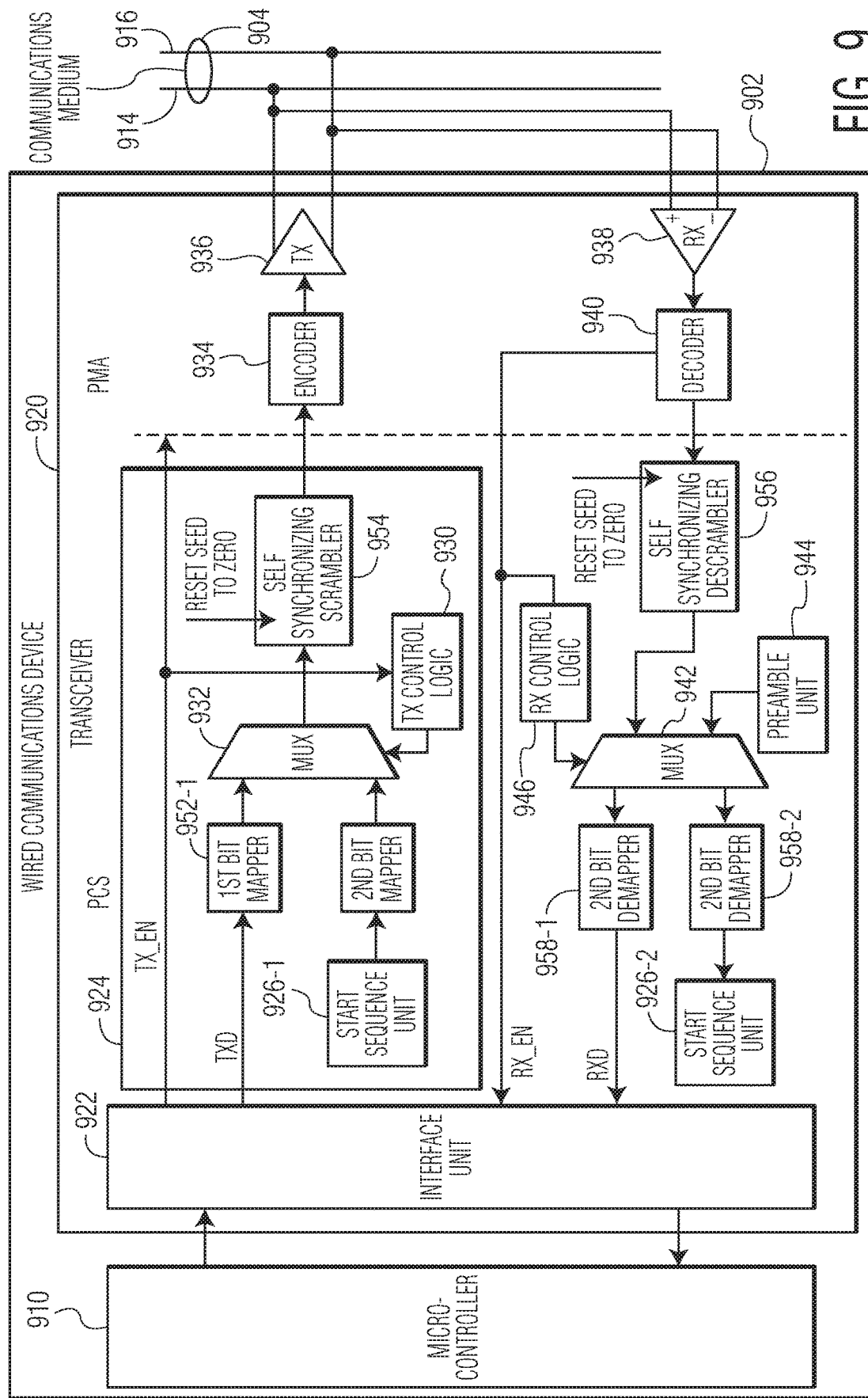
FIG. 9 depicts a wired communications device in accordance with another embodiment of the invention in which a bit scrambling operation is performed after a bit mapping operation is performed.

FIG. 9 depicts a wired communications device 902 in accordance with another embodiment of the invention in which a bit scrambling operation is performed after a bit mapping operation is performed. A difference between the wired communications device 902 depicted in FIG. 9 and the wired communications device 502 depicted in FIG. 5 is that the wired communications device 902 depicted in FIG. 9 outputs a message structure that has a completely scrambled preamble and a while the wired communications device 502 depicted in FIG. 5 outputs a message structure with an unscrambled preamble section. The wired communications device depicted in FIG. 9 is an embodiment of the wired communications devices 102 depicted in FIG. 1. However, the wired communications devices depicted in FIG. 1 are not limited to the embodiment shown in FIG. 9. In the embodiment depicted in FIG. 9, the wired communications device 902 includes a microcontroller 910 that implements Logical Link Control (LLC) sublayer operations and media access control (MAC) sublayer operations and a transceiver 920 that implements physical layer operations. The microcontroller 910 and the transceiver 920 depicted in FIG. 9 are embodiments of the microcontroller 110 and the transceiver 120 depicted in FIG. 1. Although the illustrated wired communications device is shown with certain components and described with certain functionality herein, other embodiments of the wired communications device may include fewer or more components to implement the same, less, or more functionality.

The microcontrollers 910 can implement data link layer operations as is known in the field. For example, in a receive operation, the microcontroller stores received serial bits from the transceiver 920. In a transmit operation, the microcontroller may transmit a message as serial bits in a data frame format to the transceiver.

In the embodiment depicted in FIG. 9, the transceiver 920 includes an interface unit 922, a bit manipulating unit 924, which includes a first bit mapper 952-1, a second bit mapper 952-2, a first start sequence unit 926-1, a transmitter (TX) control logic 930, a first multiplexer (MUX) 932, and a self synchronizing scrambler 954, an encoder 934, a transmitter unit (TX) 936, a receiver unit (RX) 938, a decoder 940, a self synchronizing descrambler 956, a second multiplexer 942, a receiver (RX) control logic 946, a preamble unit 944, a first bit demapper 958-1, a second bit demapper 958-2, and a second start sequence unit 926-2. In some embodiments, initial scramble seed is reset to zero for both the self synchronizing scrambler and the self synchronizing descrambler. In some embodiments, the interface unit, the first and second bit mappers, the self synchronizing scrambler, the first and second start sequence units, the transmitter control logic, the receiver control logic, the preamble unit, the first and second multiplexers, the self synchronizing descrambler, and the first and second bit demappers are included in a physical coding sublayer (PCS) and the encoder, the transmitter unit, the decoder, and the receiver unit are included in a physical medium attachment (PMA).

The interface unit 922 is configured to receive transmit data (TXD) communicated from the microcontroller 910 and to transmit receive data (RXD) to the microcontroller. In some embodiments, the interface unit is a media independent interface (MII) that receives data communicated from the microcontroller and transmit data to the microcontroller, independent from the type of a communications medium 904, which may be an embodiment of the communications medium 104. The interface unit may be implemented in suitable logical circuits (e.g., registers) and/or analog circuits.

The first bit mapper 952-1 is configured to perform a bit mapping operation on an input bit stream (e.g., a bit stream to be transmitted (TXD)) to generate a mapped bit stream. In an embodiment, the first bit mapper is configured to map groups of a first number of bits of data in the input bit stream to groups of a second number of bits in the mapped bit stream, where the first number is different from the second number. In some embodiments, the first number is smaller than the second number. In some embodiments, the first bit mapper is configured to map a first data word in the input bit stream to a second data word the mapped bit stream, where the first and second data words have different number of bits. In some embodiments, the first data word has less number of bits than the second data word. In some embodiments, the first bit mapper is a 4B5B bit mapper that maps a 4-bit data word in the input bit stream to a 5-bit data word in the mapped bit stream. The 5-bit data words may be pre-determined in a dictionary and chosen to ensure that there will be sufficient transitions in the line state to produce a self-clocking signal. The first bit mapper may be implemented in suitable logical circuits and/or analog circuits. In some embodiments, the first bit mapper includes a storage device such as memory (e.g., a RAM or a ROM) or cache.

The first start sequence unit 926-1 is configured to provide (e.g., to generate or to store) a starting bit sequence for a bit stream to be transmitted. The starting bit sequence may be encoded differently from the rest of a preamble of the bit stream, for example, to indicate to a corresponding receiver the start of a physical layer frame for synchronization purpose. In some embodiments, the start sequence unit is configured to generate a start of stream delimiter (SSD) that indicates the start of a physical layer stream. The SSD may be encoded differently from the rest of the preamble, which indicates to a corresponding receiver the start of an Ethernet frame for synchronization purposes. In some embodiments, the SSD is an octet long and is used to replace the first octet of a MAC frame, e.g., an IEEE 802.3 compatible MAC frame. The first start sequence unit may be implemented in suitable logical circuits and/or analog circuits. In some embodiments, the first start sequence unit includes a storage device such as memory (e.g., a RAM or a ROM) or cache.

The second bit mapper 952-2 is configured to perform a bit mapping operation on the starting bit sequence from the first start sequence unit 926-1 to generate a mapped starting bit sequence. In an embodiment, the second bit mapper is configured to map groups of a first number of bits of data in the starting bit sequence to groups of a second number of bits in the mapped starting bit sequence, where the first number is different from the second number. In some embodiments, the first number is smaller than the second number. In some embodiments, the second bit mapper is configured to map a first data word in the starting bit sequence to a second data word of the mapped starting bit sequence, where the first and second data words have different number of bits. In some embodiments, the first data word has less number of bits than the second data word. In some embodiments, the second bit mapper is a 4B5B bit mapper that maps a 4-bit data word in the starting bit sequence to a 5-bit data word in the mapped starting bit sequence. The 5-bit data words may be pre-determined in a dictionary and chosen to ensure that there will be sufficient transitions in the line state to produce a self-clocking signal. The second bit mapper may be implemented in suitable logical circuits and/or analog circuits. In some embodiments, the second bit mapper includes a storage device such as memory (e.g., a RAM or a ROM) or cache.

The transmitter control logic 930 is configured to control the first multiplexer 932. In the embodiment depicted in FIG. 9, the transmitter control logic controls the first multiplexer to select one of mapped bit stream to be transmitted that is provided by the first bit mapper 952-1 and a mapped starting bit sequence that is provided by the second bit mapper 952-2 as its output. The transmitter control logic may be implemented in suitable logical circuits and/or analog circuits. In some embodiments, the transmitter control logic is implemented as a processor, such as a microcontroller or a CPU.

The first multiplexer 932 is configured to select one of mapped bit stream to be transmitted that is provided by the first bit mapper 952-1 and a mapped starting bit sequence that is provided by the second bit mapper 952-2 as its output. In some embodiments, the first multiplexer is used to implement a Boolean function.

The self synchronizing scrambler 954 is configured to performing a bit scrambling operation on the output from the first multiplexer 932 to generate a scrambled bit stream. By performing the bit scrambling operation after performing the bit mapping operation, an undesired common mode signal at a corresponding receiver is reduced. The self synchronizing scrambler can be used to change a data sequence to a more random sequence. The self synchronizing scrambler does not need an agreed seed of scrambler between the wired communications device 902 and a corresponding communications device. In some embodiments, the self synchronizing scrambler is a multiplicative scrambler that is configured to perform a multiplication between an input signal and the scrambler transfer function in the z-domain. In some embodiments, the self synchronizing scrambler is further configured to reset a scrambler seed (e.g., to zero) before performing a bit scrambling operation in response to a mapped bit stream to generate a scrambled bit stream. In these embodiments, a receiver communications device that receives the encoded bit stream resets a descrambler seed (e.g., to zero) before descrambling the encoded bit stream. The self synchronizing scrambler may be the same or similar to the self synchronizing scrambler 654 depicted in FIG. 6. The self synchronizing scrambler may be implemented in suitable logical circuits and/or analog circuits. In some embodiments, the self synchronizing scrambler includes a storage device such as memory (e.g., a RAM or a ROM) or cache.

The encoder 934 is configured to encode the output data from the self synchronizing scrambler 954. The encoder may be implemented in suitable logical circuits and/or analog circuits. The encoder may implement various types of encoding schemes. Examples of encoding schemes that can be implemented by the encoder include, without being limited to, Manchester encoding (e.g., differential Manchester encoding), pulse amplitude modulation (PAM) encoding, and Non-return-to-zero (NRZ) encoding. In some embodiments, the encoder is a differential Manchester encoder (DME) as is known in the field. For example, the encoder combines data and clock signals to form a single 2-level self-synchronizing data stream.

The transmitter unit (TX) 936 is configured to transmit encoded data through the communications medium 904. The transmitter unit may be implemented in suitable logical circuits and/or analog circuits. In the embodiment depicted in FIG. 9, the transmitter unit is configured to transmit signals through lines/wires 914, 916 of the communications medium, which may be a communications bus. In some embodiments, the transmitted data is in the form of differential signals (e.g., differential Ethernet signals over twisted pair cabling).

The receiver unit (RX) 938 is configured to receive data from the communications medium 904. The receiver unit may be implemented in suitable logical circuits and/or analog circuits. In the embodiment depicted in FIG. 9, the receiver unit is configured to receive data from the lines/ wires 914, 916 of the communications medium 904, which may be a communications bus. In some embodiments, the received data is in the form of differential signals (e.g., differential Ethernet signals over twisted pair cabling).

The decoder 940 is configured to decode the output data from the receiver unit 938. The decoder may be implemented in suitable logical circuits and/or analog circuits. The decoder may implement various types of decoding schemes. Examples of decoding schemes that can be implemented by the decoder include, without being limited to, Manchester decoding (e.g., differential Manchester decoding), pulse amplitude modulation (PAM) decoding, and Non-return-to-zero (NRZ) decoding. In some embodiments, the decoder is a differential Manchester decoder (DMD) that is known in the field.

The self synchronizing descrambler 956 is configured to performing a bit descrambling operation on the output data from the decoder 940 to generate a descrambled bit stream. In some embodiments, the self synchronizing descrambler and the self synchronizing scrambler 954 have the same seed. The self synchronizing descrambler may be the same or similar to the self synchronizing descrambler 756 depicted in FIG. 7. The self synchronizing descrambler may be implemented in suitable logical circuits and/or analog circuits. In some embodiments, the self synchronizing scrambler includes a storage device such as memory (e.g., a RAM or a ROM) or cache.

The preamble unit 944 is configured to provide (e.g., to generate or to store) a preamble for a received bit stream such that the received bit stream can be processed by the microcontroller 210. For example, the preamble unit can provide a MAC preamble for a received bit stream such that the received bit stream can be processed by a MAC controller or a MAC controller function within the microcontroller. The preamble unit may be implemented in suitable logical circuits and/or analog circuits. In some embodiments, the preamble unit includes a storage device such as memory (e.g., a RAM or a ROM) or cache.

The second multiplexer 942 is configured to select one of a preamble that is provided by the preamble unit 944 or a descrambled bit stream from the self synchronizing descrambler 956 as an output. In the embodiment depicted in FIG. 9, the output of the second multiplexer is used to derive a bit starting sequence and receive data (RXD), which is data communicated from the transceiver 520 to the microcontroller 510 through the interface unit 922. In some embodiments, the second multiplexer is used to implement a Boolean function.

The receiver control logic 946 is configured to control the second multiplexer 942. The receiver control logic may be implemented in suitable logical circuits and/or analog circuits. In some embodiments, the receiver control logic is implemented as a processor, such as a microcontroller or a CPU.

The first bit demapper 958-1 is configured to perform a bit demapping operation on a first input bit stream from the second multiplexer 942 to generate a demapped bit stream. In an embodiment, the first bit demapper is configured to map groups of a first number of bits of data in a first input bit stream to groups of a second number of bits in the demapped bit stream, where the first number is different from the second number. In some embodiments, the first number is greater than the second number. In some embodiments, the first bit demapper is configured to map a first data word in the first input bit stream to a second data word of the demapped bit stream, where the first and second data words have different number of bits. In some embodiments, the first data word has more number of bits than the second data word. In some embodiments, the first bit demapper is a 4B5B bit demapper that maps a 5-bit data word in the first input bit stream to a 4-bit data word in the demapped bit stream. The first bit demapper may be implemented in suitable logical circuits and/or analog circuits. In some embodiments, the first bit demapper includes a storage device such as memory (e.g., a RAM or a ROM) or cache.

The second bit demapper 958-2 is configured to perform a bit demapping operation on a second input bit stream from the second multiplexer 942 to generate a bit starting sequence. In an embodiment, the second bit demapper is configured to map groups of a first number of bits of data in a second input bit stream to groups of a second number of bits in the bit starting sequence, where the first number is different from the second number. In some embodiments, the first number is greater than the second number. In some embodiments, the second bit demapper is configured to map a first data word in the second input bit stream to a second data word of the bit starting sequence, where the first and second data words have different number of bits. In some embodiments, the first data word has more number of bits than the second data word. In some embodiments, the second bit demapper is a 4B5B bit demapper that maps a 5-bit data word in the second input bit stream to a 4-bit data word in the bit starting sequence. The second bit demapper may be implemented in suitable logical circuits and/or analog circuits. In some embodiments, the second bit demapper includes a storage device such as memory (e.g., a RAM or a ROM) or cache.

The second start sequence unit 926-2 is configured to receive (e.g., to store) a starting bit sequence of a received bit stream. The starting bit sequence may be encoded differently from the rest of a preamble of the bit stream. In some embodiments, the starting bit sequence may be start of stream delimiter (SSD) that indicates the start of a physical layer stream. The second start sequence unit may be implemented in suitable logical circuits and/or analog circuits. In some embodiments, the second start sequence unit includes a storage device such as memory (e.g., a RAM or a ROM) or cache.

In an example operation of the transceiver 920, when there is data to be transmitted from the microcontroller 910, a signal, "TX_EN," is asserted via the interface unit 922. The physical coding sublayer (PCS) (e.g., the transmitter control logic 930) counts the number of bytes received from the interface unit and inserts start of stream delimiter (SSD) into a bit stream (e.g., by instructing the first multiplexer 932 to output the SSD from the first start sequence unit 926-1). The size of the SSD is design specific. Incoming 4-bit data word is mapped into 5-bit data word and 4-bit data word of the SSD is also mapped into 5-bit data word. The bit stream of 5-bit data word, which is selected by the first multiplexer, is scrambled using the self synchronizing scrambler 954. Initial scramble seed is reset to zero for both the self synchronizing scrambler and the self synchronizing descrambler. After the scrambling operation, output data is encoded using the encoder 934 and is transmitted as differential signals using the transmitter unit 936.

In another example operation of the transceiver 920, when there is data to be received from the receiver unit 938 as differential signals, a signal, "RX_EN," is asserted to the interface unit 922, for example, through the decoder 940. The bit stream is decoded and descrambled. The physical coding sublayer (PCS) (e.g., the receiver control logic 946) counts the number of bytes received from the receiver unit and inserts a preamble into a bit stream (e.g., by instructing the second multiplexer 942 to output a preamble from the preamble unit). After the preamble is inserted into the bit stream, the bit stream is demapped and sent to the interface unit or stored in the second start sequence unit.

Figure 10:
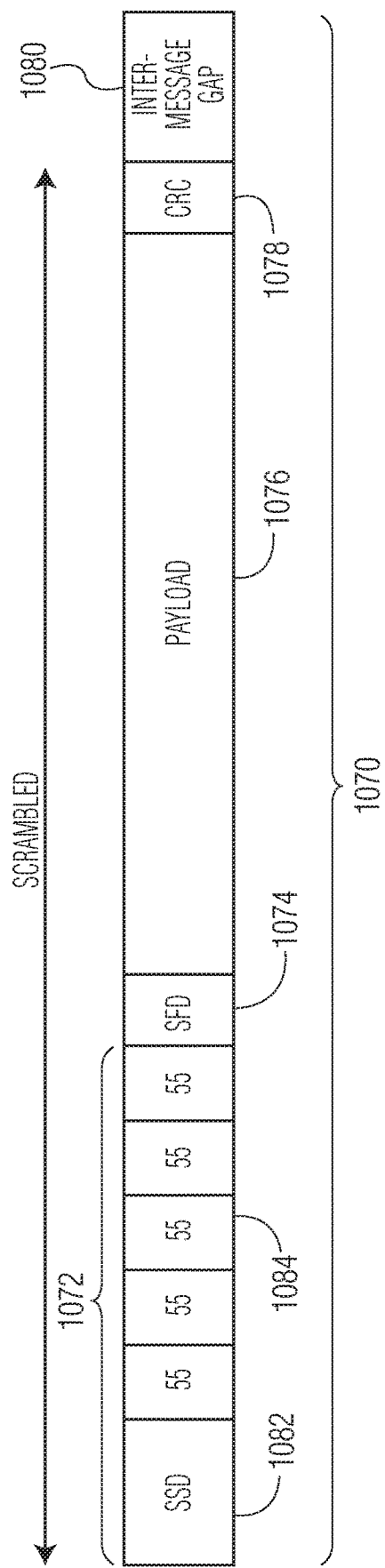
FIG. 10 depicts the format of a message structure that is produced by a transceiver of the wired communications device depicted in FIG. 9.

FIG. 10 depicts the format of a message structure 1070 that is produced by the transceiver 920 depicted in FIG. 9. The message structure depicted in FIG. 9 may be an Ethernet packet or any other type of message structure for wired communications. As depicted in FIG. 9, the message structure includes a preamble 1072 having a start of stream delimiter (SSD) 1082 and a repeating sequence 1084 of 55, 55, 55, 55, 55, a start frame delimiter (SFD) 1074, a payload 1076, a Cyclic Redundancy Check (CRC) field 1078, and an inter-message gap 1080. The preamble, the SFD, the payload, and the CRC field are scrambled. In some embodiments, the message structure further includes a MAC destination address, a MAC source address, and a message type field or message length field (e.g., an Ethertype field or an Ethernet packet length field). The inter-message gap may be a minimum idle period between transmission of adjacent messages, such as, a minimum idle period between transmission of Ethernet packets known as the interpacket gap (IPG), interframe spacing, or interframe gap (IFG).

Figure 11:
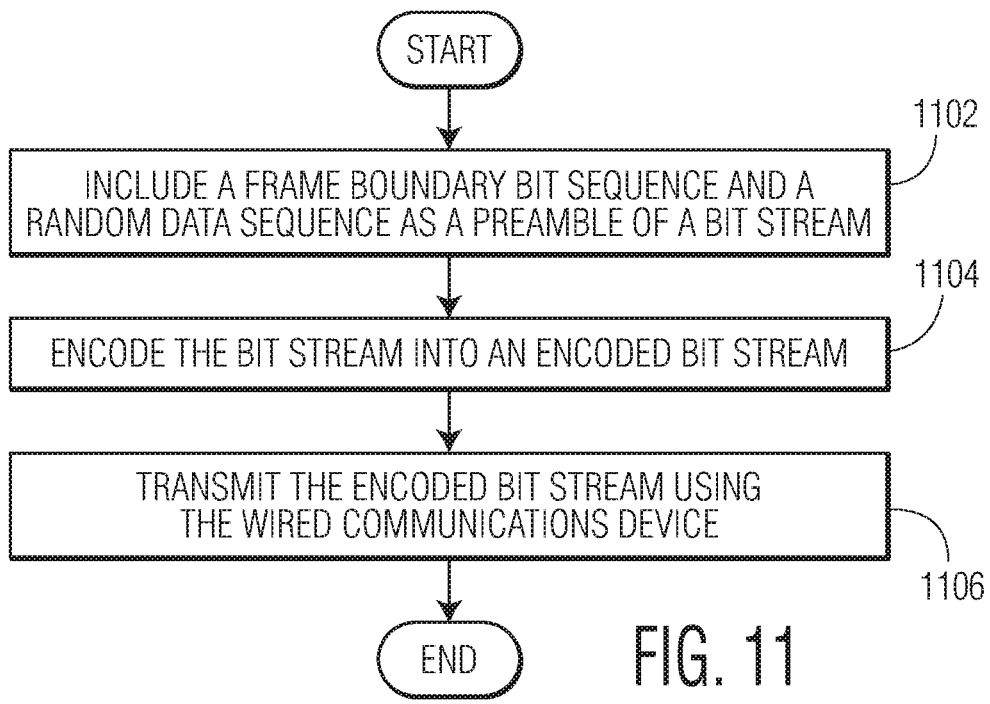
FIG. 11 is a process flow diagram of a method for operating a wired communications device in accordance with an embodiment of the invention.

FIG. 11 is a process flow diagram of a method for operating a wired communications device in accordance with an embodiment of the invention. At block 1102, a frame boundary bit sequence and a random data sequence are included as a preamble of a bit stream. At block 1104, the bit stream is encoded into an encoded bit stream. At block 1106, the encoded bit stream is transmitted using the wired communications device. The wired communications device may be the same as or similar to the wired communications devices 102 depicted in FIG. 1, the wired communications devices 202 depicted in FIG. 2, the wired communications devices 502 depicted in FIG. 5, and/or the wired communications devices 902 depicted in FIG. 9.

Figure 12:
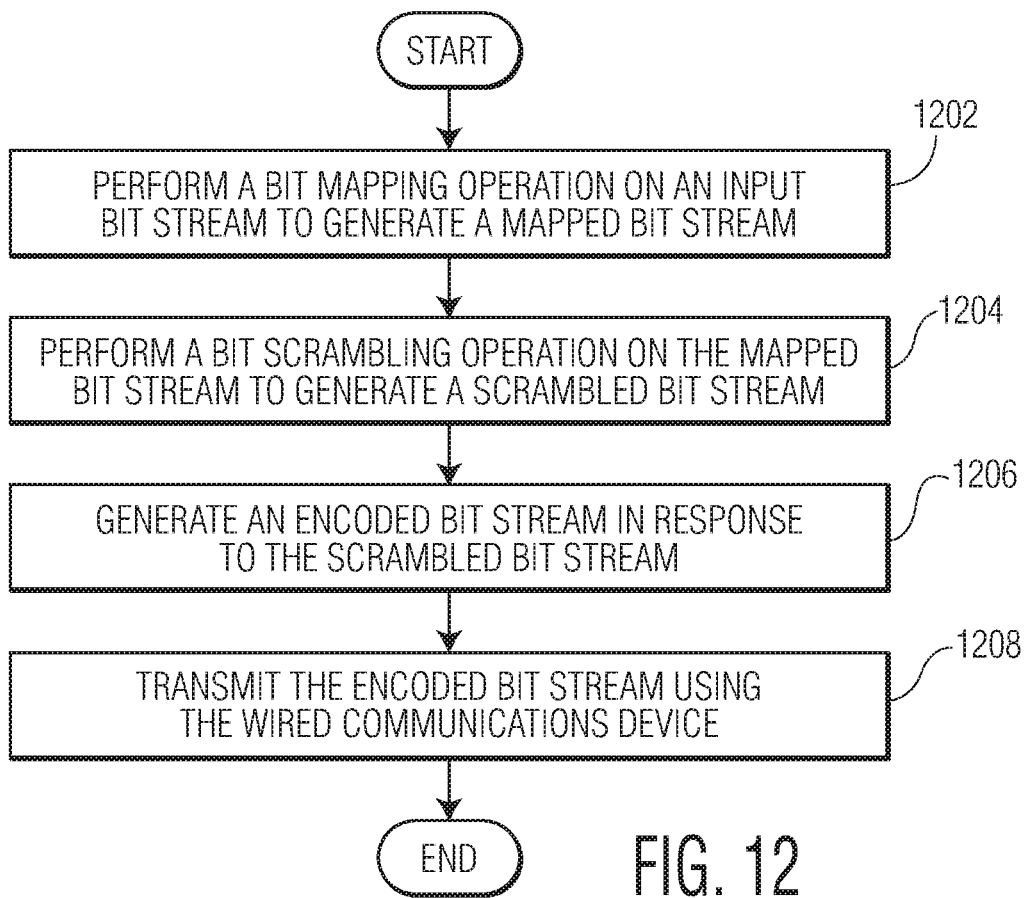
FIG. 12 is a process flow diagram of a method for operating a wired communications device in accordance with another embodiment of the invention.

FIG. 12 is a process flow diagram of a method for operating a wired communications device in accordance with an embodiment of the invention. At block 1202, a bit mapping operation is performed on an input bit stream to generate a mapped bit stream. At block 1204, a bit scrambling operation is performed on the mapped bit stream to generate a scrambled bit stream. At block 1206, an encoded bit stream is generated in response to the scrambled bit stream. At block 1208, the encoded bit stream is transmitted using the wired communications device. The wired communications device may be the same as or similar to the wired communications devices 102 depicted in FIG. 1, the wired communications devices 202 depicted in FIG. 2, the wired communications devices 502 depicted in FIG. 5, and/or the wired communications devices 902 depicted in FIG. 9.

Techniques described herein can be applied to any type of wired communications networks. Although in some embodiments an Ethernet network or an Ethernet device is described, it should be noted that the invention is not restricted to Ethernet networks or Ethernet devices.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a wired communications device, the method comprising:
   generating a random data sequence based on a thermal noise within the wired communications device;
   including a frame boundary bit sequence and the random data sequence as a preamble of a bit stream, wherein the preamble including the random data sequence is not scrambled;
   encoding the bit stream into an encoded bit stream; and
   transmitting the encoded bit stream using the wired communications device.

2. The method of claim 1, wherein the frame boundary bit sequence comprises a start of stream delimiter (SSD).

3. The method of claim 1, wherein the frame boundary bit sequence is encoded differently from a remaining portion of the preamble of the bit stream.

4. The method of claim 1, further comprising generating the random data sequence using a linear feedback shift register (LFSR).

5. The method of claim 1, wherein including the frame boundary bit sequence and the random data sequence as the preamble of the bit stream comprises selecting one of the frame boundary bit sequence, the random data sequence, and the bit stream as an output of a multiplexer.

6. The method of claim 1, wherein encoding the bit stream into the encoded bit stream comprises encoding the bit stream into the encoded bit stream using differential Manchester encoding.

7. The method of claim 1, wherein the bit stream is an Ethernet packet.

8. The method of claim 7, wherein the wired communications device is an Ethernet communications device.

9. The method of claim 1, wherein transmitting the encoded bit stream using the wired communications device comprises transmitting the encoded bit stream in differential signals using the wired communications device.

10. A wired communications device, the wired communications device comprising:
    a random data generator configured to generate a random data sequence based on a thermal noise within the wired communications device;
    a bit manipulating unit configured to include a frame boundary bit sequence and the random data sequence as a preamble of a bit stream, wherein the preamble including the random data sequence is not scrambled;
    an encoder configured to encode the bit stream into an encoded bit stream; and
    a transmitter unit configured to transmit the encoded bit stream using the wired communications device.

11. The wired communications device of claim 10, wherein the frame boundary bit sequence comprises a start of stream delimiter (SSD).

12. The wired communications device of claim 10, wherein the frame boundary bit sequence is encoded differently from a remaining portion of the preamble of the bit stream.

13. The wired communications device of claim 10, wherein the random data generator is configured to generate the random data sequence using a linear feedback shift register (LFSR).

14. The wired communications device of claim 10, wherein the bit manipulating unit comprises a multiplexer configured to select one of the frame boundary bit sequence, the random data sequence, and the bit stream as an output of a multiplexer.

15. The wired communications device of claim 10, wherein the encoder is further configured to encode the bit stream into the encoded bit stream using differential Manchester encoding.

16. The wired communications device of claim 10, wherein the wired communications device is an Ethernet communications device.

17. The wired communications device of claim 10, wherein the transmitter unit is further configured to transmit the encoded bit stream in differential signals using the wired communications device.

18. A method for operating an Ethernet device, the method comprising:
    generating a random data sequence based on a thermal noise within the wired communications device;
    including a start of stream delimiter (SSD) and the random data sequence as a preamble of an Ethernet packet, wherein the preamble including the random data sequence is not scrambled;
    encoding the Ethernet packet into an encoded Ethernet packet; and
    transmitting the encoded Ethernet packet in differential signals using the Ethernet device.

* * * * *